US009863241B2

(12) United States Patent
Shen (10) Patent No.: US 9,863,241 B2
(45) Date of Patent: Jan. 9, 2018

(54) ENHANCED 1-D METHOD FOR PREDICTION OF MUD WEIGHT WINDOW FOR SUBSALT WELL SECTION

(75) Inventor: Xinpu Shen, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 700 days.

(21) Appl. No.: 14/349,049

(22) PCT Filed: Oct. 3, 2011

(86) PCT No.: PCT/US2011/054614
§ 371 (c)(1),
(2), (4) Date: Apr. 1, 2014

(87) PCT Pub. No.: WO2013/112114
PCT Pub. Date: Aug. 1, 2013

(65) Prior Publication Data
US 2014/0246244 A1 Sep. 4, 2014

(51) Int. Cl.
*E21B 49/00* (2006.01)
*G01V 1/40* (2006.01)
(Continued)

(52) U.S. Cl.
CPC .......... *E21B 49/006* (2013.01); *E21B 7/00* (2013.01); *E21B 21/08* (2013.01); *G01V 1/40* (2013.01);
(Continued)

(58) Field of Classification Search
CPC .......... E21B 49/006; E21B 21/08; E21B 7/00; G01V 1/40; G06K 9/00214; G06K 9/00523
See application file for complete search history.

(56) References Cited

U.S. PATENT DOCUMENTS 4,599,904 A * 7/1986 Fontenot ................ G01N 33/24
73/152.46
6,502,037 B1 12/2002 Jorgensen et al.
(Continued)

FOREIGN PATENT DOCUMENTS

WO  WO2005/090750  9/2005

OTHER PUBLICATIONS

Australian Patent Examination Report No. 1, Patent Application No. 2011385380, dated Apr. 1, 2014, 3 pages, Australian Government, IP Australia.
(Continued)

*Primary Examiner* — Kamini S Shah
*Assistant Examiner* — Steven Crabb
(74) *Attorney, Agent, or Firm* — Haynes & Boone LLP (57) ABSTRACT

System and method for predicting the mud weight window in formations, particularly those formations having geologic structures such as salt domes. One embodiment is a computer-implemented method of modeling a formation in 3-D and determining a plurality of effective stress ratios for the modeled 3-D formation using finite element analysis. Thereafter, the trajectory of a proposed wellbore through the 3-D modeled formation is plotted and the specific effective stress ratios along the wellbore are selected to form a data set. The 3-D data set of effective stress ratios is then imported into 1-D modeling software and combined with 1-D data. The combined data is thereafter utilized to estimate the mud weight window for the formation around the wellbore.

24 Claims, 7 Drawing Sheets

(51) Int. Cl.
*E21B 21/08* (2006.01)
*E21B 7/00* (2006.01)
*G06K 9/00* (2006.01)

(52) U.S. Cl.
CPC ..... *G06K 9/00214* (2013.01); *G06K 9/00523* (2013.01)

(56) References Cited

U.S. PATENT DOCUMENTS

| | | | |
|---|---|---|---|
| 6,766,254 B1* | 7/2004 | Bradford | E21B 44/00 367/73 |
| 6,826,486 B1* | 11/2004 | Malinverno | E21B 44/00 367/73 |
| 7,349,807 B2* | 3/2008 | Moos | G01V 1/30 702/13 |
| 2007/0288170 A1 | 12/2007 | Sayers et al. | |
| 2008/0033704 A1* | 2/2008 | Sayers | E21B 7/04 703/10 |
| 2009/0187391 A1* | 7/2009 | Wendt | G01V 1/28 703/7 |
| 2010/0121623 A1 | 5/2010 | Yogeswaren | |
| 2010/0181073 A1* | 7/2010 | Dupriest | C09K 8/03 166/308.1 |
| 2011/0077868 A1 | 3/2011 | Ozan et al. | |
| 2011/0125333 A1* | 5/2011 | Gray | E21B 21/08 700/282 |
| 2011/0264429 A1* | 10/2011 | Lee | E21B 47/022 703/10 |
| 2013/0146357 A1* | 6/2013 | Lovorn | E21B 21/08 175/24 |
| 2015/0053483 A1* | 2/2015 | Mebane, III | E21B 44/00 175/26 |
| 2015/0292323 A1* | 10/2015 | Shahri | E21B 49/006 702/9 |
| 2016/0215593 A1* | 7/2016 | Savari | E21B 21/003 |

OTHER PUBLICATIONS

European Office Action, European Application No. 11879182.1-1559, PCT/US2011054614, dated Apr. 22, 2014, 3 pages, European Patent Office.
PCT International Search Report and Written Opinion; PCT/US2011/054614; dated Oct. 3, 2011; 13 pages; United States Receiving Office.
International Preliminary Report on Patentability and Written Opinion of the International Searching Authority, dated Apr. 8, 2014, PCT/US2011/054614, 8 pages, The International Bureau of WIPO.
Wang, et al., "Formation Pressure Calculation Model and its Field Application", P.G.O.D.D. Aug. 8, 2007, 4 pages, English abstract only.
Shen, et al., "Mud Weight Design for Deviated Wells in Shallow Loose Sand Reservoirs with 3D FEM", SPE 130717, Beijing, China, Jun. 8-10, 2010, 8 pages.
Shen, et al., "A Study of Stress Rotation in Formations: Occurrences, Mechanisms, and Numerical Simulation", ARMA 11-129, Halliburton Energy Services, Houston, Texas, Jun. 26-29, 2011, 9 pages.
Rasouli, et al. "The influence of perturbed stresses near faults on drilling strategy: A case study in Blacktip field, North Australia", Journal of Petroleum Science and Engineering 76, 2011, pp. 37-50.
Xinpu Shen, "Three-Dimensional Analysis on Stress Patterns within a Sub-Salt Formation and an Integrated Method for the Design of a Mud-Weight Window", IPTC 16540, Mar. 2013, 9 pages.
European Search Report, European Application No. 11879182.1-1559, PCT/US2011054614, dated Aug. 29, 2016, 9 pages, European Patent Office.

* cited by examiner

ENHANCED 1-D METHOD FOR PREDICTION OF MUD WEIGHT WINDOW FOR SUBSALT WELL SECTION

The present application is a U.S. National Stage patent application of International Patent Application No. PCT/US2011/054614, filed on Oct. 3, 2011, the benefit of which is claimed and the disclosure of which is incorporated herein by reference in its entirety.

BACKGROUND

In a conventional drilling process, wellbore pressure has to remain above a certain level to exclude formation fluids from the wellbore and/or prevent collapse of the borehole and below another level to prevent lost circulation. This pressure range is called the mud weight window (MWW). MWW is the range of values for mud density, which provides safe support to wellbore during the drilling process at a given depth. If the value of mud weight is chosen within the range of MWW, the wellbore is stable, and plastic deformation along the wellbore walls is minimized. Furthermore, with a safe mud weight selected within the MWW, mud loss is minimized.

The MWW is defined by two bounds which are generally the natural pressure limits of the wellbore in a formation. Its lower bound is the so-called shear failure gradient (SFG), which is the minimum mud weight required to keep the wellbore from plastic failure. The SFG is typically the formation pressure. The upper bound of the MWW is the so-called fracture gradient (FG), which is the maximum value of mud weight that can be achieved without inducing fracture openings in the formation. Because natural fractures usually exist within various kinds of formations, in practice, the value of minimum horizontal stress in mostly vertical wellbores is typically the value of FG.

In some environments, such as in highly geo-pressured formations (as encountered in geologically young offshore basins) or in depleted formations with reduced in-situ stresses straddled by formations still at virgin reservoir pressures, the allowable mud weight window may be very narrow, or in severe cases—nonexistent. A narrow mud weight window may require additional operations, for example, reducing penetration rates or setting of intermediate casing strings or drilling liners, which can greatly increase the total cost of the well. Consequently, if the mud weight window for a well can be widened, cost savings can prove enormous. Technologies exist to isolate pore pressure and consolidate the formation in the immediate vicinity of a wellbore. These technologies can effectively widen a mud weight window by reducing its lower bound.

In this same vein, how a well is planned and drilled depends on the size of the MWW. In the well design phase, a wide mud weight window can simplify the well trajectory, casing program, and other items in the well plan. With a wider window, total depth (TD) can be reached with fewer casing strings. Thus, a well can be spudded and the upper hole sections drilled with smaller bits while still providing the required production pipe diameter. In addition, cuttings volumes and disposal costs can be substantially reduced. Mud density, volume, and other properties can be adjusted to help reduce fluid costs and to help optimize drilling performance. Cement volume can also be reduced, and placement quality can be improved from better mud removal efficiency with optimized pump rates. The well can be drilled and casing installed and cemented more quickly. Even the required rig size may be reduced. Drilling a well with a wide mud weight window can substantially improve the capability to control the well and can result in improved borehole stability, drilling hydraulics, and borehole quality. These improvements can greatly increase ROP (rate of penetration) while reducing drilling incidents and subsequent trouble time. A wide MWW can prevent lost circulation, formation breakouts, and fluid influx. A wide window is also favorable to well control operations and to avoid having to set casing prematurely.

In practice, the MWW of a given wellbore can be estimated with either one-dimensional (1-D) analytical methods or three-dimensional (3-D) numerical finite element (FE) methods. The prior art 1-D methods determine horizontal stress components in terms of overburden stress and logging data along the wellbore trajectory, and only the information along the wellbore trajectory is used in determination of the MWW.

In the prior art 3-D finite element methods, a 3-D model of the formation is used, which model consists of a 3-D grid geometry and a 3-D mechanical constitutive relationship between points or nodes of the grid.

The advantage of the prior art 1-D analytical tools is that they are highly efficient. Their major disadvantage is that they require that several assumptions be made in selecting input data. Moreover, the input data cannot account for data that may have different values across the formation.

Because of the complex distribution of stress directions around a salt body, while many of the afore-mentioned assumptions are usually reasonable in prior art 1-D MWW analytical tools, they may not be sufficiently accurate for certain geo-structures within a formation, such as subsalt domes, rendering accurate prediction of MWW for such structure more difficult. Specifically, for wellbores passing through subsalt domes, values of MWW predicted by prior art 1-D analytical methods are significantly different from MWW values predicted by 3-D finite element methods. This is because the effective stress ratio for the formation at a salt base varies not only with the true vertical depth (TVD), but also varies with horizontal portions. Prior art 1-D analytical methods do not account for this.

In contrast to prior art 1-D methods, the advantage of the 3-D numerical method is that it can accurately calculate the geostress distribution within formations by a 3-D finite element analysis. Moreover, because of the variables that exist for effective stress ratios with respect to formations with geo-structures, such as at a salt base, these prior art 3-D methods have become the accepted standard for calculation of MWW in such cases.

One major disadvantage of the prior art 3-D methods, however, is that they are not as efficient as the prior art 1-D methods. Specifically, because prediction of MWW with 3-D finite element methods need to build submodels to key points along the proposed well trajectory, its computational cost is significantly higher than that required by a prior art 1-D MWW analytical method.

It would be desirable to provide a method for identifying a MWW for a well section, particularly those involving geologic structures such as salt domes, that has the accuracy of the prior art 3-D methods described above, but the efficiency of the prior art 1-D methods described above.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

To overcome the above-noted and other limitations of the current approaches, one or more embodiments described herein comprise a method of estimating the mud weight window ("MWW") for a formation, particularly those formations having geologic structures or anomalies, such as salt domes.

It has been found that for wells in isotropic formations, MWW obtained with the conventional prior art 1-D method has the same accuracy as that obtained with prior art 3-D finite element methods. However, in formations with geologic structures such as salt domes, the prior art 1-D methods for predicting MWW are deficient. The invention provides for an integrated method for predicting MWW, which combines the characteristic of 3-D stress distribution for geologic formations into the input data of 1-D software.

In accordance with features of one embodiment, the method utilizes a 3-D global model of a formation to calculate the effective stress ratio for the formation utilizing 3-D finite element analysis. The trajectory of a wellbore through the formation is selected and the effective stress ratio at points along the wellbore trajectory are identified. This set of effective stress ratio data derived from the 3-D wellbore trajectory is thereafter combined with conventional MWW data in a 1-D analytical system to estimate the MWW.

Figure 1:
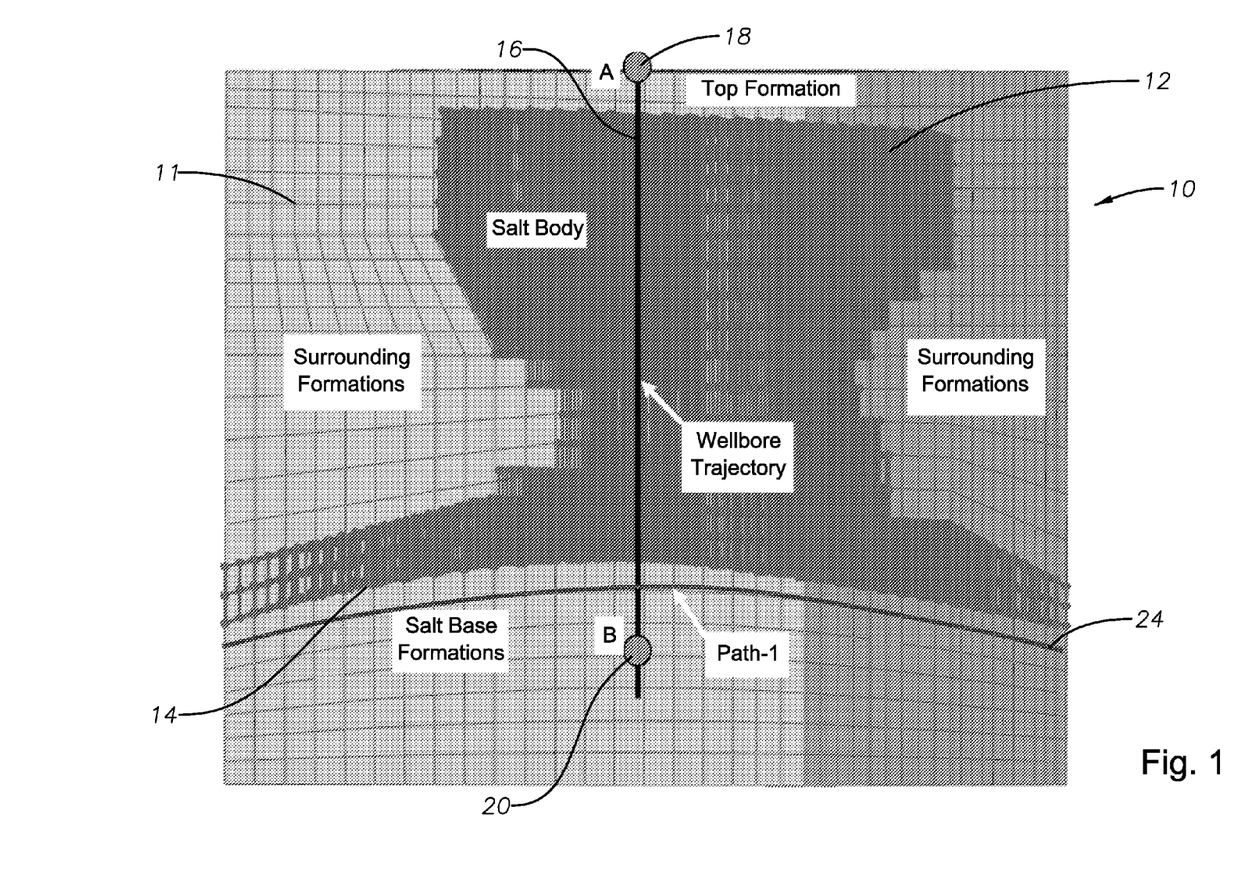
FIG. 1 illustrates a wellbore trajectory in a formation having a salt dome.

With reference to FIG. 1, a 3D representation of a formation 10 is illustrated. The formation 10 is characterized by a grid 11 and includes a geologic structure 12 with a defined base 14. Such a 3D representation is typically generated utilizing standard 3D formation modeling software that is well known in the art. 3D formation modeling software permits a formation to be modeled with a wellbore defined therein. In the illustration, a portion of a proposed wellbore 16 is illustrated defined between a first point 18, preferably above geologic structure 12, and a second point 20, preferably below geologic structure 12. While a portion of the proposed wellbore shown in FIG. 1 is vertical with second point 20 disposed thereon, wellbore 16 need not be vertical but may be deviated, such is illustrated by path 24, in which case, second point 20 may lie along a deviated portion of wellbore 16.

Typically in the prior art methods of 1-D prediction of MWW, input data includes a first set of data to predict the upper bound of the MWW, i.e., the FG, and a second set of data to predict the lower bound of the MWW, i.e., the SFG. Specifically, in order to predict the upper bound of the MWW, the following data is typically utilized: pore pressure (PP), overburden gradient (OBG), and effective stress ratio and/or Poisson's ratio. Likewise, in order to predict the lower bound of the MWW window, the following data is typically utilized: cohesive strength (CS), friction angle, (FA) and/or uniaxial compression strength (UCS), and tectonic factor.

More particularly, in the prior art method of 1-D prediction of the FG of MWW, the effective stress ratio, a value between 0 and 1, is approximated and used to determine the FG. The approximation of the effective stress ratio is typically based on experience and/or data from other wellbores in the area of the proposed wellbore. The approximated FG is provided as input to the 1-D MWW prediction software, along with other known values. Thus, the FG is only as good as the accuracy of the guess of effective stress ratio. Moreover, and significantly, in the prior art 1-D MWW estimation methods, whatever value is selected for the effective stress ratio is utilized as a constant value throughout the formation and across the geologic structure.

The definition of effective stress ratio, $k_0$, is:

$$k_0 = \frac{S_h - pp}{OBG - pp} \quad (1)$$

where, $S_h$ is the minimum horizontal stress.

Poisson's ratio is an alternative for the input of effective stress ratio. Values of effective stress ratio, k, are calculated in terms of Poisson's ratio, v:

$$k = \frac{v}{1-v} \quad (2)$$

Thus, 1-D MWW prediction software commonly will calculate effective stress ratio in terms of Poisson's ratio.

With respect to the prior art method of 1-D prediction of the SFG of MWW, not only is an approximated effective stress ratio utilized, but also a value for the tectonic factor, another kind of stress-related input data, is approximated, again based on experience and/or data from other wellbores in the area of the proposed wellbore.

The definition of tectonic factor is:

$$t_f = \frac{S_H - S_h}{OBG - S_h} \quad (3)$$

where, $S_H$ is the maximum horizontal stress. When $t_f$=0, $S_H$=$S_h$; when $t_f$=1, $S_H$=OBG.

As with the effective stress ratio, usually, the value of $t_f$ is approximated between 0 and 1. Specifically, in the conventional 1-D analysis, the value of $t_f$ is approximated by the method of "phenomena fitting." The drilling report and image log of an offset wellbore in the neighborhood of the target well are required to obtain a reasonable value of $t_f$ with the conventional 1-D method. If any breakout was found in the image logging data of the offset wellbore, the value of $t_f$ will be adjusted to allow the shear failure to occur at that position. The process for determining $t_f$ is fairly experience-dominated. In practice, specific geo-structures have significant influence on the value of $t_f$ in the region. However, limited by its 1-D property, the conventional 1-D method usually cannot take geo-structural factors into account in estimating the value of $t_f$.

As mentioned above, FIG. 1 illustrates the trajectory of a portion of wellbore 16 in formation 10. In the particular illustration of FIG. 1, wellbore 16 is a vertical well passing through a salt body 12. In this illustration, the thickness of the salt body where the wellbore 16 passes through is 5,600 m. The width of the model built in the calculation is 8,000 m, and the height is 9,000 m. The target formation is at the salt base 14, which is at the true vertical depth ("TVD") interval of 7,500 to 8,500 m.

Figure 2:
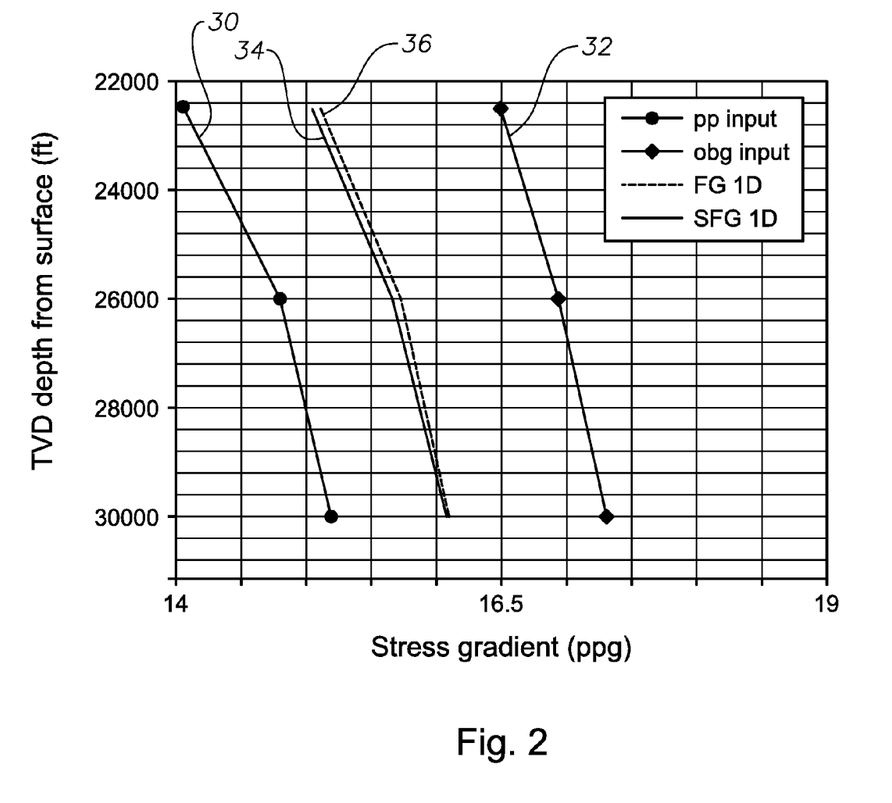
FIG. 2 is a graph illustrating numerical results of SFG and FG obtained with the prior art 1-D method.

FIG. 2 illustrates the results of conventional 1-D analysis of MWW utilizing Equations 1-3 above. The prediction of the MWW is made at the TVD interval of 7,500 to 8,500 m. Curve 30 represents the pore pressure at this interval while curve 32 represents the overburden gradient at this interval. The values of material parameters are given in Table 1.

TABLE 1

| Materials | Density kg/m3 | Young's Modulus Pa | Poisson's Ratio | CS/Pa | Friction Angle |
|---|---|---|---|---|---|
| Top layer | 1,900 | 1 × 10$^{10}$ | 0.3 | elastic | |
| Salt | 2,250 | 1.3 × 10$^{10}$ | 0.3 | 2 × 10$^6$ | 25° |
| Surrounding Rock | 2,350 | Depth dependent | 0.3 | 1 × 10$^6$ | 25° |
| Base formation | 2,350 | Depth dependent | 0.25 | 2 × 10$^6$ | 25° |

In the illustrative example, the value of Poisson's ratio from Table 1 is utilized in Equation 2 to yield an effective stress ratio of 0.43, which is then inputted into the conventional 1-D analysis software thereby resulting in the lower limit curve 34 of FIG. 2.

With respect to the upper limit curve 36 of FIG. 2, for the purpose of illustration, the value of $t_f$ is set at 0.5, which indicates that the maximum horizontal stress, $S_H$, is in the middle between $S_h$ and OBG. Mohr-Coulomb plastic yielding criterion is adopted in the calculation. Illustrative frictional angle and cohesive strength are listed in Table 1. This tectonic factor is likewise imported into conventional 1-D MWW estimation software, resulting in curve 36.

As can be seen in FIG. 2, the MWW, i.e., the spread between curves 34 and 36, calculated utilizing prior art 1-D MWW software is rather narrow for the salt-based section, due primarily to the weakness of the formation strength. In other words, the formation strength parameters tend to have a very significant impact on the conventional 1-D MWW calculations.

Figure 3:
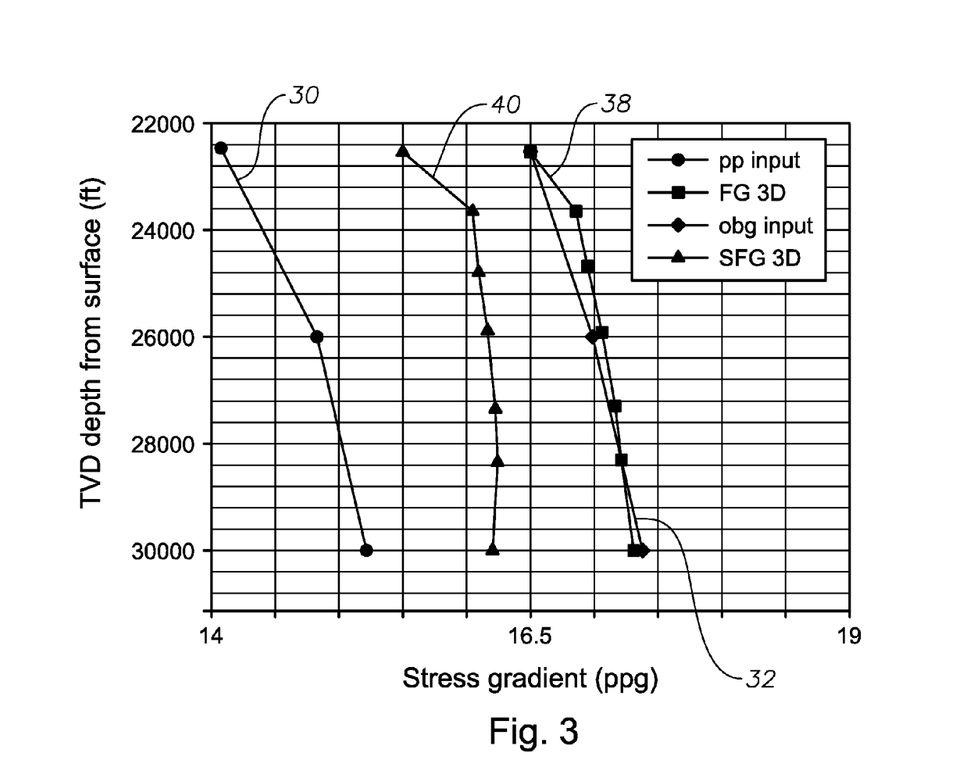
FIG. 3 is a graph illustrating numerical results of SFG and FG obtained with the prior art 3-D method.

In contrast, FIG. 3 illustrates the MWW when these same parameters are used in a 3-D MWW calculation where the effective stress ratio is obtained by 3-D finite element analysis. Specifically, the 3-D finite element method can build the geo-structure into the model and, thus, naturally takes the influence of the geo-structure into account in the SFG calculation. As mentioned above, FIG. 1 illustrates a 3-D grid or finite-element model of the formation under analysis. Boundary conditions of zero normal displacement have been applied to 4 lateral sides as well as the bottom surface of geologic structure. Gravity is the load that balances initial geostress field and pore pressure. The linear elastic constitutive model is used to model the formation and surrounding rocks, and the visco-elastoplastic model is used to model salt rock.

Figure 4:
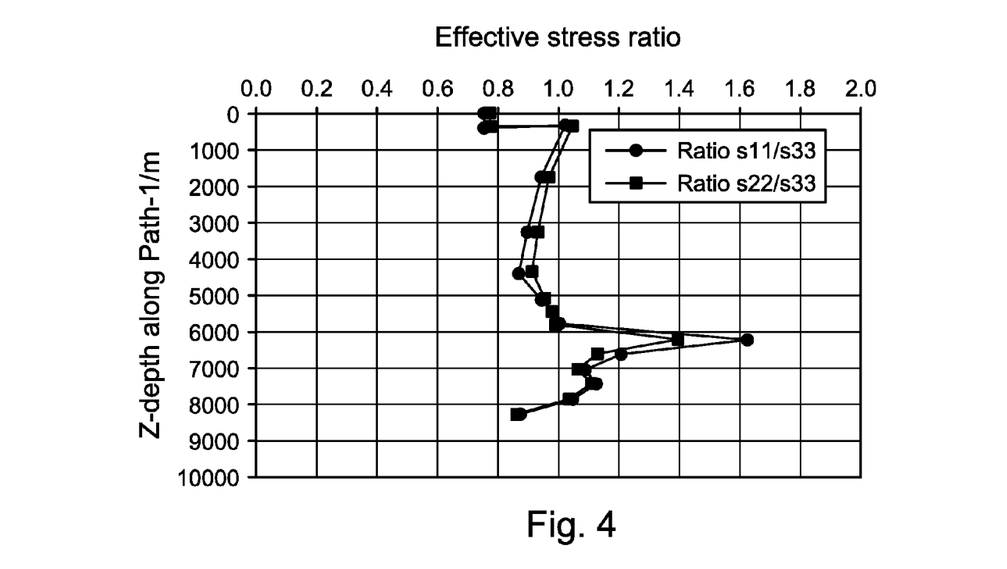
FIG. 4 is a graph showing the effective stress ratio along the vertical portion of the wellbore trajectory of FIG. 1.

Numerical results of the effective stress ratios for points on the vertical portion of wellbore 16 (see FIG. 1) are illustrated in FIG. 4. For selected points along this portion of the wellbore trajectory, the numerical results of the effective stress ratios are listed in Table 2.

TABLE 2

| TVD Depth along Trajectory | Effective stress ratio S11/S33 | Effective stress ratio S22/S33 |
|---|---|---|
| 5,793 | 1.01 | 1.00 |
| 6,202 | 1.62 | 1.40 |
| 6,612 | 1.21 | 1.13 |
| 7,021 | 1.09 | 1.07 |
| 7,431 | 1.12 | 1.11 |
| 7,841 | 1.05 | 1.04 |
| 8,251 | 0.87 | 0.87 |

However, according to the definition of FG, its value equals to the minimum absolute value of compressive stress component among the 3 components of stress tensor at a point. Therefore, when the effective stress ratio is larger than 1, the overburden/vertical stress component will be the minimum absolute value of compressive stress component and, thus, taken as the FG. Consequently, the value of effective stress ratio should be 1 in this case.

Figure 5:
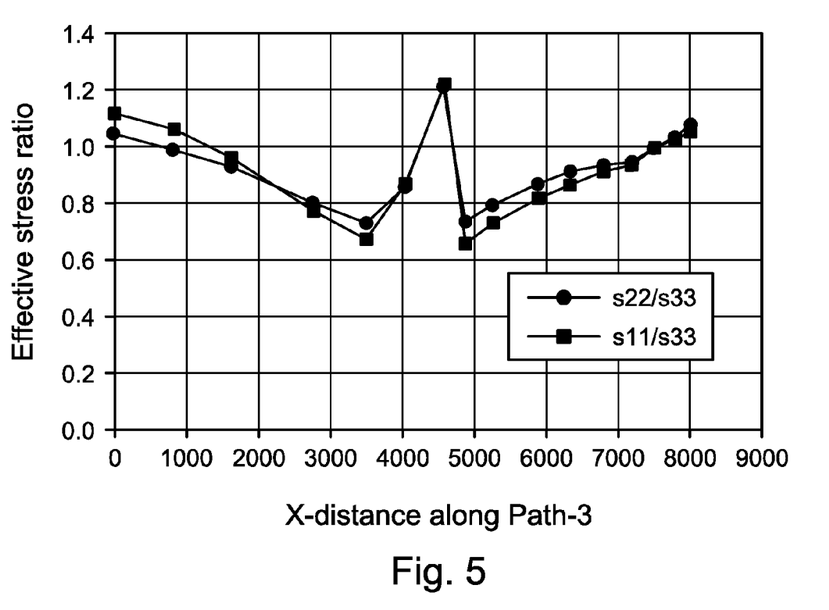
FIG. 5 is a graph showing the effective stress ratio along the horizontal portion of the wellbore trajectory of FIG. 1.

To investigate the stress pattern within the salt-base formation, the distribution of effective stress ratio along the horizontal portion of wellbore 16 is shown in FIG. 5. It can be seen that the effective stress ratio varies significantly from 0.65 to 1.23 with the horizontal coordinates of the points investigated.

Figure 6:
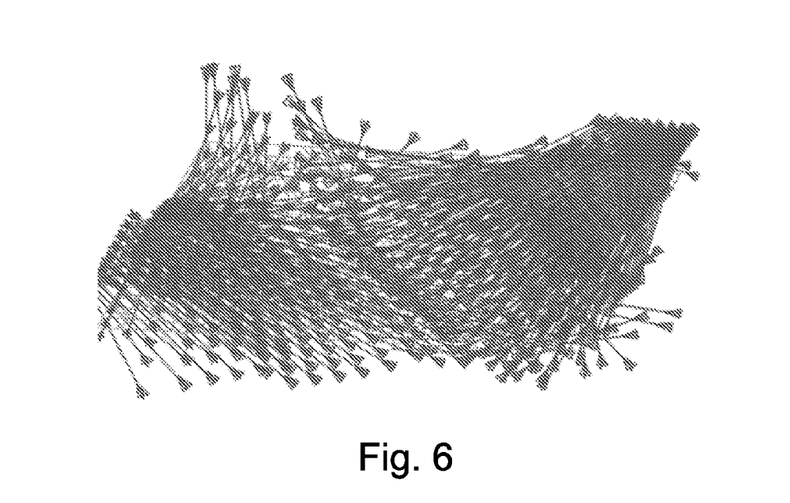
FIG. 6 illustrates the finite element results of the minimum principal stress at the salt-base formation of FIG. 1 with TVD depth=6,142 m (z-coordinate=2,858 m) in 3-D space.
Figure 7:
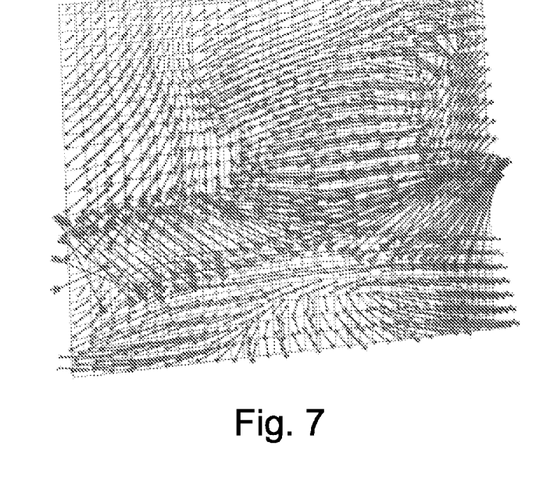
FIG. 7 illustrates the finite element results of the minimum principal stress in the plane, which is normal to the central axis of salt body of FIG. 1.

Numerical results of the sectional distribution of minimum principal stress obtained by the 3-D finite elements method as applied to the grid 11 of FIG. 1 are shown in FIGS. 6 and 7. As shown in FIGS. 6 and 7, the direction of the minimum principal stress vector in the neighborhood of a salt body varies significantly from place to place, resulting in an irregular distribution of the effective stress ratio within formations. Since the prior art 1-D MWW calculation method uses only a single value for effective stress ratio across the entire formation, this explains the narrow MWW window of FIG. 2. Moreover, this illustrates that effective stress ratio cannot be selected to be a simply constant, or, even a linear equation, particularly around structures such as salt domes.

Referring back to FIG. 3, curve 38 represents the upper MWW limit or FG calculated utilizing prior art 3-D finite element MWW software, while curve 40 represents the lower MWW limit or SFG calculated utilizing such software. As can be seen, the spread between curves 38 and 40 is significantly larger compared to the spread between curves 34 and 36 calculated utilizing prior art 1-D MWW software. As shown in FIG. 3, the FG solutions obtained with the prior art 3-D method are larger than the overburden gradient 32 at some points of TVD depth. In general, FG is the minimum stress component of a stress tensor, and, thus, it is limited by the overburden gradient 32. However, the calculation of the overburden gradient with the prior art 1-D method is only the summation/accumulation of the gravity above the point calculated along the trajectory; no structural factor is considered. Because the prior art 3-D method utilizes finite element analysis to calculate the overburden gradient 32 in 3-D, the lateral influence is taken into consideration in the calculation process through equilibrium equation. The density of salt is typically lighter than that of the surrounding rock formations. Therefore, the overburden gradient obtained with the prior art 3-D method is usually higher than the prior art 1-D method. Consequently, the FG solution obtained with the prior art 3-D method may sometimes be larger than the overburden gradient. In any event, those skilled in the art will appreciate that MWW calculations utilizing 3-D analysis software to generate the MWW curves are time consuming, resource consuming and may be cost prohibitive.

The method of the invention draws upon 3-D analysis to determine effective stress ratios, but utilizes this data in 1-D MWW calculations. Utilizing the same formation variables as utilized to generate the MWW curves of FIGS. 2 and 3, the method of the invention results in the MWW curves shown in FIG. 8. Specifically, curve 41 represents the upper MWW limit and curve 42 represents the lower MWW limit. It can be seen that the method of the invention results in a significantly larger MWW span than was realized with the traditional 1-D MWW calculation method. Although the value of SFG does not change much from the 1-D solution (compare curve 34 of FIG. 2 and curve 42 of FIG. 8), the value of FG of the enhanced solution is significantly increased and becomes very close to overburden gradient 32 (compare curves 36 of FIG. 2 and curve 41 of FIG. 8).

The effective stress values used in the method of the invention are listed in Table 3.

TABLE 3

| TVD Depth along Trajectory | Effective stress ratio S11/S33 |
|---|---|
| 5793 | 1.00 |
| 6202 | 1.00 |
| 6612 | 1.00 |
| 7021 | 1.00 |
| 7431 | 1.00 |
| 7841 | 1.00 |
| 8251 | 0.87 |

Figure 8:
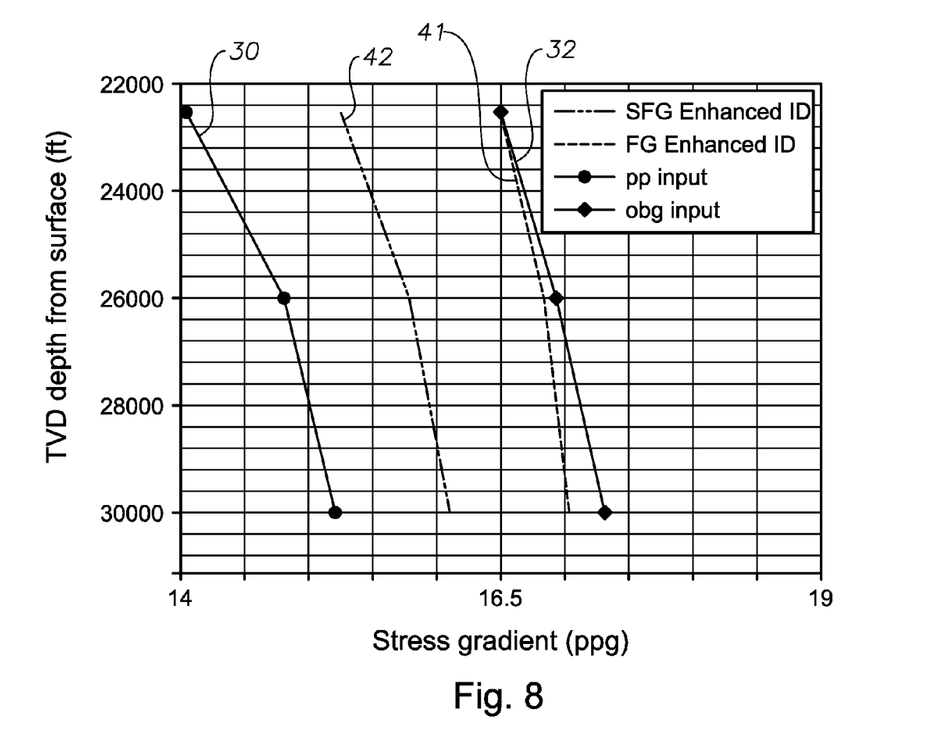
FIG. 8 is a graph illustrating numerical results of SFG and FG obtained with the 1-D method of the invention.
Figure 9:
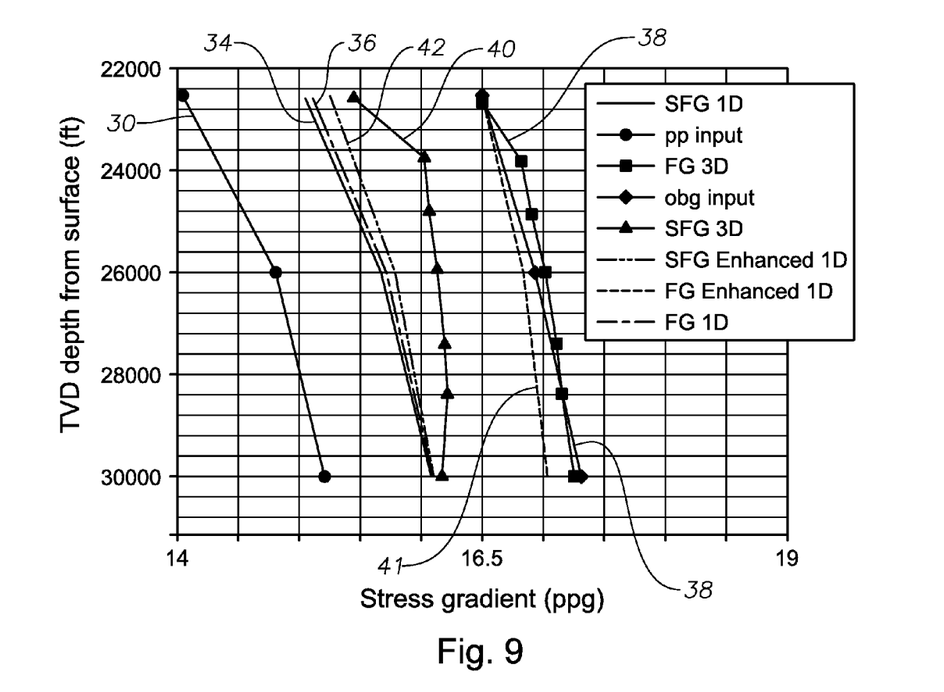
FIG. 9 is a graph comparing the results of SFG and FG shown in FIGS. 2, 3 and 8.

Omitting the details of the numerical procedures, the solution of the MWW obtained with the prior art 1-D method, the prior art 3-D method and the method of the invention are shown in FIG. 9, overlaying the curves of FIGS. 2, 3 and 8. As mentioned above, in each case, the same values of strength parameters were utilized. Notably, the solution of FG (curve 41) obtained with the method of the invention is higher than the prior art 1-D solution and much closer to the prior art 3-D solution.

Those skilled in the art will appreciate that predictions of MWW for a given salt-base wellbore section have been made for illustration purpose. Solutions obtained with prior art 1-D methods have been compared with the solutions obtained with the prior art 3-D finite element methods. A solution of MWW predicted with the method of the invention is presented and compared with the other two conventional prior art methods. Results indicate that the method of the invention combines the merits of high efficiency for the conventional prior art 1-D solution with the high accuracy of the prior art 3-D method.

Effective stress ratio around a salt body is typically not a constant. However, the prior art 1-D method requires that effective stress ratio be treated as a constant, rendering the method particularly ineffective in analysis involving salt domes or similar structures. With numerical results shown in FIG. 5, it can be seen that the values of effective stress ratio for points at the salt-base formation along horizontal path 24 vary from 0.67 to 1.22 from left to right. Consequently, the empirical prior art 1-D methods will be inefficient in cases but will be not proper in other cases for determination of effective stress ratio for the salt-base well sections. On the other hand, with a detailed description of geo-structure in its model, the prior art 3-D finite element method much more often generates accurate values of effective stress ratio for well sections, even in the neighborhood of complicated salt geometry, but with a shortcoming of very high computational cost.

Notably, in instances where Poisson's ratio can be derived from sonic logging data, the prior art 1-D method can also use a set of effective stress ratios which vary with TVD depth, instead of using a constant ratio value for the whole well section. This can improve the solutions for FG and MWW, however, even such a prior art 1-D method is limited by its 1-D property such that the measure of using logging data cannot include factors of specific geo-structure into its input data. Thus, it cannot avoid the aforementioned inaccuracy in its conventional 1-D solution of MWW for subsalt well sections. The method of the invention eliminates the need for the use of the forgoing Equations 1-3 in the estimation of the MWW.

Figure 10:
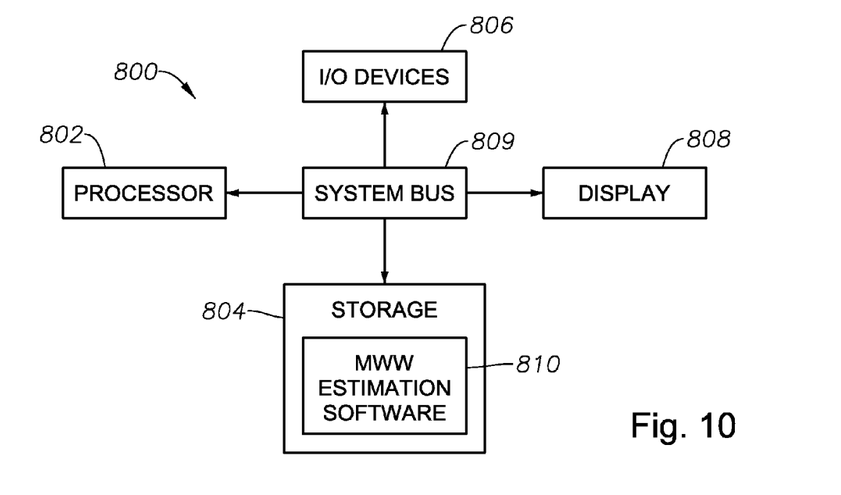
FIG. 10 is a block diagram of a computer system adapted for implementing a MWW estimation system of exemplary embodiments.

FIG. 10 is a block diagram of an exemplary computer system 800 adapted for implementing the MWW estimation system of the invention as described herein. In one embodiment, the computer system 800 includes at least one processor 802, storage 804, optional I/O devices 806, and an optional display 808, all interconnected via a system bus 809. Software instructions executable by the processor 802 for implementing a MWW prediction/estimation system 810 in accordance with the embodiments described herein, may be stored in storage 804. Although not explicitly shown in FIG. 10, it will be recognized that the computer system 800 may be connected to one or more public and/or private networks via appropriate network connections. It will also be recognized that the software instructions comprising 3-D effective stress ratio calculations and 1-D MWW estimation system 810 may be loaded into storage 804 from a CD-ROM or other appropriate storage media.

In one embodiment of the invention, a portion of the MWW estimation system 810 is implemented using 1-D MWW software known in the art. Such software typically utilizes 1-D inputs. This representation of the reservoir combined with additional 3-D effective stress ratio data allows the system to estimate the boundaries of the MWW.

Figure 11:
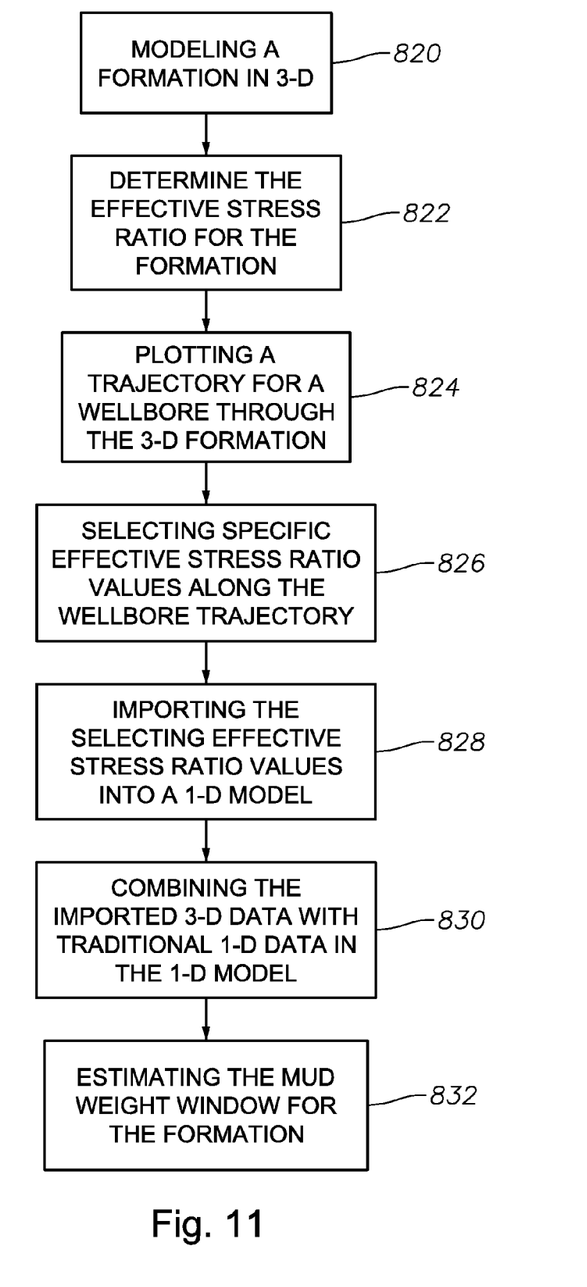
FIG. 11 is a flowchart illustrating a method implemented by the MWW estimation system of FIG. 10 for performing embodiments described herein.

Turning to FIG. 11, methods employed by the system 810 are illustrated. In step 820, a formation for which the MWW is to be estimated is modeled in 3-D, employing a grid having a multiplicity of fine cells, nodes or blocks. With a grid defined, in step 822, the effective stress ratio for the nodes of the grid are determined. The preferred method is to use 3-D finite element analysis, although those skilled in the art will appreciate that other 3-D analysis tools may also be used, such as finite difference software. The identified effective stress ratios are retained for utilization following step 824.

In step 824, a trajectory for proposed wellbore through a formation is plotted through the 3-D model. Thereafter, in step 826, specific effective stress ratio values along the wellbore trajectory are selected.

In step 828, these specific effective stress ratio values along the wellbore trajectory are imported as the effective stress ratio values into 1-D MWW estimation software. In step 830, these effective stress ratio values are combined with traditional 1-D MWW values, such as pore pressure and strength parameters, and used in the MWW calculations. In step 832, the MWW for the modeled formation is calculated.

Thereafter, a drilling plan may be implemented based on the estimated MWW. The plan includes drilling of a wellbore through a formation consistent with the trajectory of the modeled formation. The plan further includes selecting and utilizing one or more fluids or muds having a weight within the estimated MWW. Those skilled in the art will appreciate that while the method of the invention has been described statically as part of implementation of a drilling plan, the method can also be implemented dynamically. Thus, a drilling plan may be implemented, including the drilling of a wellbore and injection of mud into the wellbore. After implementing the drilling plan, the system of the invention may be utilized during the drilling process to calculate the MWW on the fly or iteratively calculate and re-calculate the MWW over a period of time as parameters change or are clarified or adjusted. In either case, the results of the dynamic calculations may be utilized to alter a previously implemented drilling plan. For example, the dynamic calculations may result in the utilization of a heavier or lighter drilling fluid than previously selected or that may be in use.

Alternatively, in combination with either a static or dynamic utilization of the invention, techniques known in the art may be used to widen the MWW. The method of the invention may be used iteratively in this regard. An initial MWW may be calculated. If the calculated MWW is not desirable, the MWW may be widened by implementing various MWW widening techniques, such as re-selecting wellbore trajectory, or by selecting new values for controllable variables that would result in widening of the MWW. Thereafter, the drilling plan would include altering the plan to achieve the adjusted controllable variables. A subsequent MWW calculation using the method of the invention may be utilized to determine the new MWW. These steps may be repeated as necessary to develop a drilling plan with a MWW that falls within a desired range.

While certain features and embodiments of the invention have been described in detail herein, it will be readily understood that the invention encompasses all modifications and enhancements within the scope and spirit of the following claims. Furthermore, no limitations are intended in the details of construction or design herein shown, other than as described in the claims below. Moreover, those skilled in the art will appreciate that description of various components as being oriented vertically or horizontally are not intended as limitations, but are provided for the convenience of describing the invention.

It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed:

1. A computer-implemented method, the method comprising:
    generating a 3-D model of a formation;
    determining a plurality of effective stress ratio values for the 3-D model;
    plotting, within the 3-D model, a trajectory for a wellbore to be drilled through the formation;
    selecting effective stress ratio values from the plurality of effective stress ratios, based on the trajectory plotted within the 3-D model;
    importing the selected effective stress ratio values from the 3-D model into a 1-D model for estimating a mud weight window for the formation;
    combining the imported 3-D data with 1-D data utilizing the 1-D model;
    estimating the mud weight window for the formation based on the combined data within the 1-D model; and
    drilling the wellbore through the formation based on the estimated mud weight window.

2. The computer-implemented method of claim 1, wherein the 1-D data comprises pore pressure and formation strength parameters.

3. The method of claim 1, wherein the step of modeling comprises developing a 3-D grid having a multiplicity of nodes.

4. The method of claim 3, wherein the effective stress ratio for each of a plurality of nodes is determined.

5. The method of claim 1, wherein the step of determining the effective stress ratios utilizes finite element analysis.

6. The method of claim 1, wherein the formation includes a geostructure defined therein, and wherein the step of plotting a trajectory includes selecting a first end of the wellbore above the geostructure and a second end of the wellbore below the geostructure.

7. The method of claim 1, wherein the trajectory has a vertical component and a horizontal component.

8. The method of claim 6, wherein the trajectory has a vertical component and a horizontal component.

9. The method of claim 8, wherein the vertical component is defined substantially within the geostructure and the vertical component is defined below the geostructure.

10. The method of claim 9, wherein the geostructure is a salt dome.

11. The method of claim 1, wherein the wellbore is drilled according to a drilling plan being implemented based on the estimated mud weight window for the formation.

12. The method of claim 11, wherein the implementation of the drilling plan includes drilling a wellbore in the formation substantially along the trajectory plotted in the 3-D model and utilizing fluids within the estimated mud weight window.

13. A method for drilling a wellbore in a formation having a saltbase structure formed therein, the method comprising:
    developing a 3-D model for the formation;
    calculating a plurality of effective stress ratios for the 3-D model;
    plotting, within the 3-D model, a trajectory of the wellbore through the saltbase structure of the formation;
    selecting the effective stress ratios at points along the trajectory of the wellbore plotted within the 3-D model;
    importing the selected effective stress ratios from the 3-D model into a 1-D mud weight window analytical tool;
    utilizing the 1-D mud weight window analytical tool to predict a mud weight window for the formation, based on the imported effective stress ratios in conjunction with pore pressure and strength parameters of the formation; and
    drilling the wellbore through the formation based on the estimated mud weight window.

14. The method of claim 13, wherein the wellbore is drilled according to a drilling plan being implemented based on the estimated mud weight window.

15. The method of claim 14, wherein the implementation of the drilling plan comprises drilling a wellbore through the formation at a trajectory consistent with the trajectory of the modeled formation and utilizing one or more drilling fluids having a weight within the estimated mud weight window.

16. The method of claim 15, further comprising repeating the selecting, the performing and the utilizing during the implementation of the drilling plan and adjusting the drilling plan based on the re-performed steps.

17. The method of claim 16, wherein the step of adjusting comprises altering the wellbore trajectory.

18. The method of claim 16, wherein the step of adjusting comprises altering the weight of the drilling fluid.

19. The method of claim 13, further comprising the step of adjusting the mud weight window based on changes to one or more of the pore pressure and strength parameters as the wellbore is drilled through the formation.

20. The method of claim 19, wherein the step of adjusting the width of the mud weight window comprises altering the wellbore trajectory.

21. The method of claim 20, further comprising repeating the selecting, the performing and the utilizing once the mud weight window has been widened.

22. A method for drilling a wellbore in a formation during a portion of a wellbore construction process subsequent to a first portion, which method comprises:
    preparing equipment to construct a portion of said wellbore
      using a first construction process;
    modeling the formation in 3-D;
    determining effective stress ratios for the modeled 3-D formation;
    plotting a trajectory for the wellbore through the modeled 3-D formation;
    selecting specific effective stress ratio values along the wellbore trajectory;
    importing the selected effective stress ratio values into a 1-D model for estimating mud weight windows;
    combining the imported effective stress ratio values with 1-D data utilizing the 1-D model; and
    estimating the mud weight window for the formation based on the combined data within the 1-D model;
    constructing said wellbore using a second process different from said first process, based on the estimated mud weight window for the formation.

23. The method of claim 22, comprising the step of rotary drilling a first portion of the wellbore using a drilling process.

24. A computer-implemented system for identifying the mud weight window of a formation, the system comprising:
    a processor;
    a storage medium accessible by the processor; and
    software instructions stored on the storage medium and executable by the processor for:
      modeling the formation in 3-D;
      determining a plurality of effective stress ratios for the modeled 3-D formation;
      plotting a trajectory for a wellbore through the modeled 3-D formation;
      selecting specific effective stress ratio values along the wellbore trajectory;
      importing the selected effective stress ratio values into a 1-D model for estimating mud weight windows;
      combining the imported effective stress ratio values with 1-D data utilizing the 1-D model;
      estimating the mud weight window for the formation based on the combined data within the 1-D model; and
      drilling the wellbore through the formation based on the estimated mud weight window.

* * * * *